US011286388B2

(12) United States Patent
Zhang et al.

(10) Patent No.: US 11,286,388 B2
(45) Date of Patent: Mar. 29, 2022

(54) HIGH FLOW POLY(PHTHALAMIDE) COMPOSITIONS, AND ARTICLES MADE THEREFROM

(71) Applicant: SHPP GLOBAL TECHNOLOGIES B.V., Bergen op Zoom (NL)

(72) Inventors: Yaqin Zhang, Shanghai (CN); Liang Shen, Shanghai (CN); Mingcheng Guo, Shanghai (CN); Wei Zhang, Shanghai (CN)

(73) Assignee: SHPP Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 17/289,362

(22) PCT Filed: Oct. 28, 2019

(86) PCT No.: PCT/IB2019/059242
§ 371 (c)(1),
(2) Date: Apr. 28, 2021

(87) PCT Pub. No.: WO2020/089781
PCT Pub. Date: May 7, 2020

(65) Prior Publication Data
US 2021/0317309 A1    Oct. 14, 2021

(30) Foreign Application Priority Data
Oct. 30, 2018    (EP) ..................................... 18203571

(51) Int. Cl.
*C08L 77/06*    (2006.01)
(52) U.S. Cl.
CPC ......... *C08L 77/06* (2013.01); *C08L 2205/025* (2013.01)

(58) Field of Classification Search
None
See application file for complete search history.

(56) References Cited

U.S. PATENT DOCUMENTS

| 2002/0173584 | A1 | 11/2002 | Ebert et al. |
| 2010/0249292 | A1 | 9/2010 | Saga et al. |
| 2013/0022786 | A1 | 1/2013 | Topoulos |
| 2017/0081473 | A1 | 3/2017 | Benstead et al. |

FOREIGN PATENT DOCUMENTS

KR    20170099297 A    8/2017

OTHER PUBLICATIONS

Extended European Search Report issued in European Application No. 18203571.7, dated May 9, 2019, 23 pages.
International Search Report and Written Opinion dated Feb. 17, 2020 in PCT/IB2019/059242.

*Primary Examiner* — Ana L. Woodward
(74) *Attorney, Agent, or Firm* — Quicker Law, LLC

(57) ABSTRACT

A reinforced poly(phthalamide) composition comprising 20-80 weight percent of a poly(phthalamide) component comprising 15-55 weight percent of a crystalline poly(phthalamide), and 5-45 weight percent of an amorphous poly(phthalamide); 0.5-60 weight percent of a reinforcing filler; and 0.1-50 weight percent of an additive composition; wherein weight percent is based on the total weight of the reinforced poly(phthalamide) composition and totals 100; and wherein the reinforced poly(phthalamide) composition has a capillary melt viscosity, measured according to ASTM D3835 (2015) at 320° C., at 5000 $s^{-1}$, that is at least 10% lower than that of the same reinforced poly(phthalamide) composition without the amorphous poly(phthalamide), and a warpage that is at least 15% lower than that of the same reinforced poly(phthalamide) composition without the amorphous poly(phthalamide).

11 Claims, No Drawings

HIGH FLOW POLY(PHTHALAMIDE) COMPOSITIONS, AND ARTICLES MADE THEREFROM

CROSS-REFERENCE TO RELATED APPLICATION

This application is the National Stage of International Application No. PCT/IB2019/059242 filed Oct. 28, 2019, which claims priority to and the benefit of European Application No. 18203571.7 filed Oct. 30, 2018, the disclosures of which are incorporated herein by this reference in their entireties.

BACKGROUND

Poly(phthalamide)s (PPA) are high performance polymers having high strength, heat resistance, and modulus, and broad chemical resistance. Poly(phthalamide)s are widely used in applications including automotive, telecommunications, aerospace, electrical/electronics, transportation, food service, and healthcare. Polymers such as PPA can have low heat transfer coefficients, such that the rate of heat transfer during processing is slow and can lead to warpage. The addition of reinforcing fillers to polymer compositions can increase the rate of heat transfer and decrease warpage to some extent. However, the addition of reinforcing fillers increases the viscosity of the compositions. High viscosity polymer compositions can be difficult to process during the manufacture of articles and can result in articles with a rough surface.

Accordingly, there remains a continuing need for high flow poly(phthalamide) compositions with reinforcing fillers.

SUMMARY

A reinforced poly(phthalamide) composition is provided, comprising 20-80 weight percent of a poly(phthalamide) component comprising: 15-55 weight percent of a crystalline poly(phthalamide), and 5-45 weight percent of an amorphous poly(phthalamide); 0.5-60 weight percent of a reinforcing filler; and 0.1-50 weight percent of an additive composition;
wherein the crystalline poly(phthalamide) comprises
55 mole percent of units of formula (Ia)

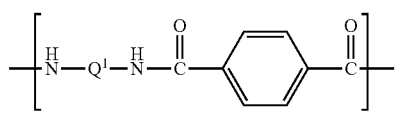

wherein $Q^1$ is 1,6-hexylene;
45 mole percent of units of formula (II)

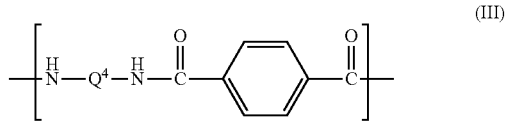

wherein $Q^2$ is 1,6-hexylene and $Q^3$ is 1,4-butylene; and
wherein the amorphous poly(phthalamide) comprises
50 mole percent of units of the formula (III)

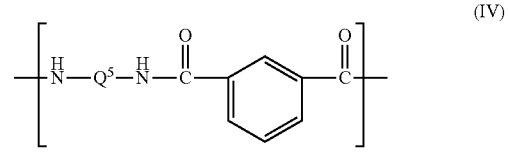

wherein $Q^4$ is 2-methylpentylene; and
50 mole percent of units of the formula (IV)

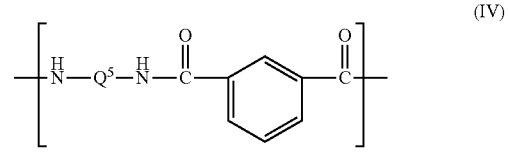

wherein $Q^5$ is 2-methylpentylene, and
wherein weight percent is based on the total weight of the reinforced poly(phthalamide) composition and totals 100; and wherein the reinforced poly(phthalamide) composition has a capillary melt viscosity, measured according to ASTM D3835 (2015) at 320° C., at 5000 s$^{-1}$, that is at least 10% lower than that of the same reinforced poly(phthalamide) composition without the amorphous poly(phthalamide), and a warpage that is at least 15% lower than that of the same reinforced poly(phthalamide) composition without the amorphous poly(phthalamide).

An article comprising the reinforced poly(phthalamide) composition represents another aspect of the disclosure.

The above described and other features are exemplified by the following detailed description.

DETAILED DESCRIPTION

Disclosed herein are reinforced poly(phthalamide) compositions and articles comprising the reinforced poly(phthalamide) compositions. The compositions contain a combination of a crystalline and an amorphous poly(phthalamide). Although the compositions are reinforced, the combination of crystalline and amorphous PPA renders them high flow and thus more easily processed. The compositions can be used to produce articles with reduced warpage.

Poly(phthalamide)s (PPA) are semi-aromatic, high temperature polyamides that have melting points higher than 290° C. and glass transition temperatures greater than 80° C. The glass transition temperature and the melting point are indicative of the aromatic content of the PPA. PPAs comprise residues of aromatic acids (e.g., terephthalic acid and isophthalic acid) that comprise at least 55 molar percent of the dicarboxylic acid portion of the repeating units in the polymer chain. For example, PPAs can be copolymers that have various ratios of repeating units such as polyamide 6T (hexamethylenediamine and terephthalic acid), polyamide 6I (hexamethylenediamine and isophthalic acid), polyamide DT (2-methylpentamethylenediamine and terephthalic acid, polyamide DI (2-methylpentamethylenediamine and isophthalic acid), and polyamide 6/6 (hexamethylenediamine and adipic acid).

The reinforced poly(phthalamide) composition comprises 20-80 weight percent of a poly(phthalamide) component comprising 15-55 weight percent of a crystalline poly(phthalamide), 5-45 weight percent of an amorphous poly(phthalamide); 0.5-60 weight percent of a reinforcing filler; and 0.1-50 weight percent of an additive composition.

The crystalline poly(phthalamide)s comprises repeating units of formula (I)

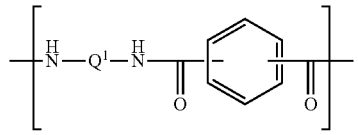
(I)

In a preferred aspect, 6 carbon atoms are present in $Q^1$.

In addition to the repeating units of formula (I), the crystalline poly(phthalamide) comprises units of formula (II)

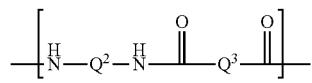
(II)

In a preferred aspect, 6 carbon atoms are present in $Q^2$ and 4 carbons atoms are present in $Q^3$.

In a preferred aspect, the crystalline poly(phthalamide) comprises 55 mole percent of units of formula (Ia)

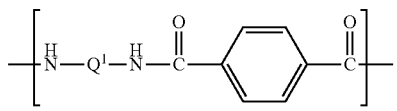
(Ia)

wherein $Q^1$ is 1,6-hexylene; and
45 mole percent of units of formula (II)

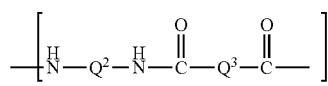
(II)

wherein $Q^2$ is 1,6-hexylene and $Q^3$ is 1,4-butylene.

The amorphous poly(phthalamide) comprises repeat units of formula (I) as described above, preferably 50 mole percent of units of formula (III)

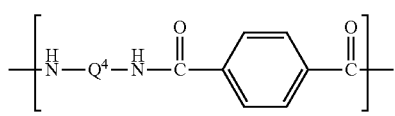
(III)

wherein $Q^4$ is 2-methylpentylene; and 50 mole percent of units of formula (IV)

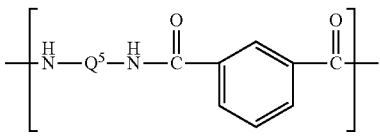
(IV)

wherein $Q^5$ is 2-methylpentylene.

In preferred aspect, the poly(phthalamide) component comprises a crystalline poly(phthalamide) comprising 55 mole percent of units of formula (Ia) wherein $Q^1$ is 1,6-hexylene, and 45 mole percent of units of formula (II) wherein $Q^2$ is 1,6-hexylene and $Q^3$ is 1,4-butylene; and an amorphous poly(phthalamide) comprising 50 mole percent of units of the formula (III) wherein $Q^4$ is 2-methylpentylene and 50 mole percent of units of the formula (IV) wherein $Q^5$ is 2-methylpentylene.

Poly(phthalamide)s of formulae (I), (Ia), (III), and (IV) can be the condensation products of terephthalic acid and a diamine, isophthalic acid and a diamine, or a combination of terephthalic acid, isophthalic acid and a diamine. When using more than one diamine the ratio of the diamines can affect some of the physical properties of the resulting polymer such as the melt temperature. Poly(phthalamide)s of formula (II) can be the condensation product of a dicarboxylic acid and a diamine. When using more than one acid, the ratio of the acids can affect some of the physical properties of the resulting polymer as well. The ratio of diamine to dicarboxylic acid is equimolar although excesses of one or the other can be used to determine the end group functionality. In addition, the reaction can further include monoamines and monocarboxylic acids that function as chain stoppers and determine, at least in part, the end group functionality. In some aspects it is preferable to have an amine end group content of greater than or equal to about 30 milliequivalents per gram (meq/g), or greater than or equal to about 40 meq/g.

Examples of organic diamines are 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6- hexanediamine. Combinations of these compounds can be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The poly(phthalamide) component comprising the crystalline poly(phthalamide) and the amorphous poly(phthalamide) can be present in the reinforced composition in an amount of 20-80 weight percent preferably 30-60 weight percent, more preferably 45-55 weight percent, wherein weight percent is based on the total weight of the reinforced poly(phthalamide) composition.

The crystalline poly(phthalamide) has a crystallinity of greater than 40%, preferably greater than 50%; and the amorphous poly(phthalamide) has a crystallinity of less than 40%, preferably less than 30%.

The reinforced poly(phthalamide) composition further comprises a reinforcing filler. Reinforcing fillers can include mica, clay, feldspar, quartz, quartzite, perlite, tripoli, diatomaceous earth, aluminum silicate (mullite), synthetic calcium silicate, fused silica, fumed silica, sand, boron-nitride powder, boron-silicate powder, calcium sulfate, calcium carbonates (such as chalk, limestone, marble, and synthetic precipitated calcium carbonates) talc (including fibrous, modular, needle shaped, and lamellar talc), wollastonite, hollow or solid glass spheres, silicate spheres, aluminosilicate, kaolin, whiskers of silicon carbide, alumina, boron carbide, iron, nickel, or copper, continuous and chopped carbon fibers or glass fibers, molybdenum sulfide, zinc sulfide, barium titanate, barium ferrite, barium sulfate, heavy spar, $TiO_2$, aluminum oxide, magnesium oxide, particulate or fibrous aluminum, bronze, zinc, copper, or nickel, glass flakes, flaked silicon carbide, flaked aluminum diboride, flaked aluminum, steel flakes, as well as combinations comprising at least one of the foregoing reinforcing fillers. The reinforcing fillers can be coated with a layer of metallic material to facilitate conductivity, or surface treated with silanes to improve adhesion and dispersion with the polymer matrix.

In some aspects the reinforcing filler is glass fiber, carbon fiber, titanium dioxide, clay, talc, mica, silica, mineral filler, wollastonite, glass spheres, flaked glass, milled glass, carbon black, or a combination thereof. In a preferred aspect, the reinforcing filler comprises glass fibers.

In some aspects, the reinforcing filler is glass flake, glass fiber, clay, magnesium (II) hydroxide, talc, alpha-aluminum oxide hydroxide (e.g., boehmite), gamma-aluminum oxide hydroxide (e.g., diaspore), aluminum (III) hydroxide (e.g., gibbsite), boron nitride, graphite, or combinations thereof.

The reinforcing filler, preferably glass fibers, can be present in an amount of 0.5-60 wt % based on the total weight of the composition. Within this range the amount of reinforcing filler, preferably glass fibers, can be 10-60 wt %, 20-60 wt %, 30-60 wt %, 40-60 wt %, 45-55 wt %, or 45-50 wt %. In some aspects, the reinforcing filler has 100 parts per million (ppm) or less of elements selected from the group consisting of mercury, lead, cadmium, tin, antimony, arsenic and thallium.

Useful glass fibers can be formed from any type of known fiberizable glass composition, and include, for example, those prepared from fiberizable glass compositions commonly known as "E-glass," "C-glass," "D-glass," "R-glass," "S-glass," as well as E-glass derivatives that are fluorine-free and/or boron-free. Commercially produced glass fibers have nominal filament diameters of 4.0-35.0 µm, and most commonly produced E-glass fibers can have a nominal filament diameter of 9.0-30.0 µm. For example, glass fibers can have a diameter of 9-20 µm or 10-15 µm.

The filaments can be made by standard processes, for example, by steam or air blowing, flame blowing and mechanical pulling. The filaments for polymer reinforcement can be made by mechanical pulling. A fiber having a non-round cross section can be used. The glass fibers can be sized or unsized. The glass fibers can have various cross-sectional shapes, for example, round, trapezoidal, rectangular, square, crescent, bilobal, trilobal, and hexagonal. In an embodiment, the glass can be soda free. Fibrous glass fibers comprising lime-alumino-borosilicate glass, known as "E" glass, can be especially useful. Glass fibers can greatly increase the flexural modulus and strength of the poly (phthalamide) compositions. The glass fibers can be used in the form of chopped strands, having lengths of about ⅛ inch (3 mm) to about ½ inch (13 mm). In an aspect, the glass fibers can have a length of 2.0-6.0 mm, preferably 3.0-4.0 mm and an aspect ratio of 2.0-5.0, preferably 3.5-4.5. In some embodiments, rovings can be used. The glass fiber length in molded articles prepared from compositions comprising the glass fibers can be shorter than the above-mentioned lengths, presumably due to fiber fragmentation during compounding of the composition. For example, the length of the glass fibers in a molded article can be less than about 2 mm.

The glass fibers can optionally be treated with various coupling agents to improve adhesion to the polymeric matrix. Examples of coupling agents can include alkoxy silanes and alkoxy zirconates, amino-, epoxy-, amide- and mercapto-functionalized silanes, and organometallic coupling agents, including, for example, titanium- or zirconium-containing organometallic compounds.

The glass fibers can be sized or unsized. Sized glass fibers are coated on their surfaces with a sizing composition selected for compatibility with the compatibilized blend. The sizing composition facilitates wet-out and wet-through of the poly(phthalamide) blend upon the fiber strands and assists in attaining desired physical properties in the reinforced composition. The sizing composition can be present in an amount of 0.1-5 wt % based on the weight of the glass fibers, or 0.1-2 wt % based on the weight of the glass fibers.

In preparing the glass fibers, a number of filaments can be formed simultaneously, sized with the coating agent, and then bundled into a strand. Alternatively, the strand itself can be first formed of filaments and then sized. The amount of sizing employed is that amount which is sufficient to bind the glass filaments into a continuous strand and can be, for example, 0.1-5 wt %, or 0.1-5 wt %, or 0.1-2 wt %, or 0.1-2 wt % based on the weight of the glass fibers.

The glass fibers can be continuous or chopped. Glass fibers in the form of chopped strands can have a length of 0.3-10 centimeters (cm), 0.5 mm-5 cm, 1.0 mm-2.5 cm, or 0.2-20 mm, 0.2-10 mm, or 0.7-7 mm.

The glass fiber can have a round (or circular), flat, or irregular cross-section. The diameter of the glass fiber can be 1-20 µm, or 4-15 µm, or 1-15 µm, or 7-15 µm. In an aspect, the glass fiber can have a round cross section or a flat cross section.

Glass fibers suitable for use can include, but are not limited to, CSG 3PA-820, which have an elliptical, non-circular cross-section, a 4 µm length and an aspect ratio of 4, commercially available from NITTOBO.

The reinforced poly(phthalamide) composition further comprises an additive composition including various additives ordinarily incorporated into thermoplastic compositions, with the proviso that the additives are selected so as to not significantly adversely affect the desired properties of the poly(phthalamide) composition, for example the melt flow, elongation, strength, impact, or the like. The additive composition can include a particulate filler, anti-blocking agent, impact modifier, ultraviolet (UV) light stabilizer, anti-drip agent, antioxidant, anti-static agent, anti-drip agent, blowing agent, dye, flame retardant, flow promoter, fragrance, heat stabilizer, light stabilizer, lubricant, metal deactivator, metal salt, mold release agent, nucleating agent, pigment such as such as titanium dioxide, carbon black, and organic dyes, plasticizer, processing aid, radiation stabilizer, surface effect additive, or a combination thereof. A combination of additives can be used, for example a combination of a heat stabilizer, mold release agent, and ultraviolet light stabilizer. The additives are used in the amounts known to be effective. For example, the total amount of the additives (other than any impact modifier, filler, or reinforcing agents) can be 0-50 wt % based on the total weight of the reinforced poly(phthalamide) composition. In an aspect, the additive composition can comprise a heat stabilizer, an antioxidant, a mold release agent, or a combination thereof. Heat stabilizer additives include organophosphites (e.g. triphenyl phosphite, tris-(2,6-dimethylphenyl)phosphite, tris-(mixed mono- and di-nonylphenyl)phosphite or the like), phosphonates (e.g, dimethylbenzene phosphonate or the like), phosphates (e.g., trimethyl phosphate, or the like), or combinations comprising at least one of the foregoing heat stabilizers. The heat stabilizer can be tris(2,4-di-t-butylphenyl) phosphate, commercially available as IRGAPHOS 168. Heat stabilizers are generally used in amounts of 0.01-5 wt %, based on the total weight of polymer in the composition.

Antioxidant additives include organophosphites such as tris(nonyl phenyl)phosphite, tris(2,4-di-t-butylphenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)]methane; butylated reaction products of para-cresol or dicyclopentadiene; alkylated hydroquinones; hydroxylated thiodiphenyl ethers; alkylidene-bisphenols; benzyl compounds; esters of beta-(3, 5-di-tert-butyl-4-hydroxyphenyl)-propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, octadecyl-3-(3,5-di-tert-butyl-4-hydroxyphenyl)propionate, pentaerythrityl-tetrakis[3-(3,5-di-tert-butyl-4-hydroxyphenyl) propionate; amides of beta-(3,5-di-tert-butyl-4-hydroxyphenyl)-propionic acid, or combinations comprising at least one of the foregoing antioxidants. An example of a suitable commercially available stabilizer is ULTRANOX 626 (phosphite stabilizer) available from Crompton Corporation.

Mold release additives include phthalic acid esters such as dioctyl-4,5-epoxy-hexahydrophthalate; tris-(octoxycarbonylethyl)isocyanurate; tristearin; di- or polyfunctional aromatic phosphates such as resorcinol tetraphenyl diphosphate (RDP), the bis(diphenyl) phosphate of hydroquinone and the bis(diphenyl) phosphate of bisphenol A; poly-alpha-olefins; epoxidized soybean oil; silicones, including silicone oils; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants comprising polyethylene glycol polymers, polypropylene glycol polymers, poly(ethylene glycol-co-propylene glycol) copolymers, or a combination comprising at least one of the foregoing glycol polymers, e.g., methyl stearate and polyethylene-polypropylene glycol copolymer in a suitable solvent; waxes such as beeswax, montan wax, paraffin wax, or the like. One example of a suitable commercially available mold release agent is SYNPRO 15F (calcium stearate) available from Valtris Specialty Chemicals.

In an aspect, the reinforced poly(phthalamide) composition comprises 49.5 wt % of a poly(phthalamide) component comprising 50 mole percent of a crystalline poly(phthalamide), and 50 mole percent of an amorphous poly(phthalamide); 50 wt % of a reinforcing filler; and 0.5 wt % of an additive composition.

The reinforced poly(phthalamide) compositions can be manufactured by various methods according to general techniques which are known. The poly(phthalamide) compositions can be made by melt-blending the components using any known methods. For example, a poly(phthalamide) and other optional components can be first blended in a HENSCHEL-Mixer high speed mixer. Other low shear processes, including but not limited to hand-mixing, can accomplish this blending. The blend can then be fed into a twin-screw extruder via a hopper. Alternatively, at least one of the components can be incorporated into the composition by feeding directly into the extruder at the throat and/or downstream through a side-stuffer. Additives can be compounded into a masterbatch containing the desired poly (phthalamide) and fed into the extruder. The poly(phthalamide) compositions can be melt-processed at temperatures of 240-340° C. The extrudate can be quenched in a water bath and pelletized. The pellets so prepared can be one-fourth inch long or less as desired. Such pellets can be used for subsequent molding, shaping, or forming.

The reinforced poly(phthalamide) composition can have one or more of the following properties: a capillary melt viscosity, measured according to ASTM D3835 (2015) at shear rates of 100, 200, 500, 1000, 1500, 3000, and 5000 s$^{-1}$ and a temperature of 380° C. that is at least 10% lower than that of the poly(phthalamide) composition wherein the amorphous poly(phthalamide) is absent.

In an aspect, the reinforced poly(phthalamide) can have a lower warpage when compared to compositions wherein the amorphous poly(phthalamide) is absent according to an internal test as described in the disclosure. The warpage of the reinforced poly(phthalamide) composition can be decreased by more than 10%, or by more than 20%, or by more than 30%, or by more than 40%, or by more than 50%, or by more than 60%, or by more than 70%, or by more than 80%, or by more than 90%, as compared to the poly (phthalamide) composition wherein the amorphous poly (phthalamide) is absent.

The composition is useful for forming a variety of articles, for example, an electrical connector, an electrical socket, a circuit board, a circuit board component, a computer component, a display screen component, a communication device component, or a component of a hand-held electronic device. Suitable methods of forming such articles include pressure molding, injection molding, or extruding the article.

The reinforced poly(phthalamide) compositions can be formed into articles using any suitable techniques, for example, melt-processing techniques. In an aspect, the article is a thin article, for example a housing for an electronic device, the thin article having a maximum thickness of 3 cm, 2.5 cm, 2 cm, 1 cm, 0.5 cm, or 0.2 cm. At least some portion of the article can have a thickness of 0.01-2.0 mm, for example, at least some portion of the article can have a thickness of 0.1-2 mm, or 0.5-2 mm. The article can have a length that is at least 10 times the thickness, for example, the length of the article can be at least 100 times the thickness. In some embodiments, the longest aspect of the article can be at least 5 cm.

The invention is further illustrated by the following non-limiting examples.

EXAMPLES

The materials used are provided in Table 1.

TABLE 1

| Component | Description, trade name | CAS Registry No. | Source |
|---|---|---|---|
| PPA (crystalline) | Polyamide 6T/66, available as N600 | 25776-72-1 | NHU specialty |
| PPA (amorphous) | Polyamide DT/DI, available as NOVADYN DT/DI | 131538-25-5 | Invista |
| GF | Silica glass fiber, CSG 3PA-820 | 65997-17-3 | Nittobo |
| PS | Phosphite stabilizer, ULTRANOX 626 | 26741-53-7 | Crompton Corp. |
| AO | Antioxidant, AO1010 | 6683-19-8 | BASF |
| MRA | Calcium stearate, SYNPRO 15F (mold release agent) | 1592-23-0 | Valtris Specialty Chemicals |

All tests, except for warpage, were based on ASTM standards, test year 2015, as provided in Table 2.

TABLE 2

| Test | Test Standard | Specimen Type | Units |
|---|---|---|---|
| Flexural (Flex) Test | ASTM D790 | Bar-127 × 12.7 × 3.2 mm | MPa |
| Heat distortion temperature (HDT) | ASTM D648 | Bar-127 × 12.7 × 3.2 mm (1.82 MPa) | ° C. |
| Notched Izod Impact (23° C.) (NII) | ASTM D256 | Bar-63.5 × 12.7 × 3.2 mm | J/m |
| Unnotched Izod Impact (23° C.) (UNI) | ASTM D256 | Bar-63.5 × 12.7 × 3.2 mm | J/m |
| Tensile Test | ASTM D638 | ASTM Type I Tensile bar | MPa |
| Specific Gravity | ASTM D792 | — | — |
| Warpage | SABIC Internal Test | Disc-Diameter 135 × thickness 1.2 mm | inch |
| Capillary melt viscosity | ASTM D3835 | Pellets | Pa.s |

Measurement of Warpage. A 1 kg weight was placed at the gate to affix the disc (diameter 135 mm, thickness 1.2 mm) to a flat table surface. A feeler gauge was used to measure the thickness of the disc at points A, B, and C. The thickness at points A, B, and C was recorded as Warpage-A, Warpage-B, and Warpage-C, respectively.

All examples are polymer compositions filled with mixed fillers of different ratios. All of the components except the glass fiber reinforcing filler were dry blended for 3-5 minutes in a super-floater. The polymers were pre-dried at 150° C. for about 4 hours before extrusion. The glass fiber was fed at the down-stream with a side feeder. The blends were added at the throat. Formulations were compounded on a 37 mm Toshiba twin-screw with vacuum vented extruder at a 340-360° C. barrel set temperature with 300-350 rpm and 55-60 kg/hr. After compounding, the pellets were dried 4-6 h at 150° C. and injection molded on a 110-ton Fanuc injection molding machine; ASTM bars were molded with a barrel temperature setting at 340-360° C. and mold temperature 150° C.

Examples 1-7 (Ex1-Ex7) and a comparative example (CEx1) were prepared as described above, using the materials and amounts shown in Table 3. All samples contained 50 weight percent glass fiber, with varying amounts of amorphous PPA (0 weight percent in CEx1). Samples were tested, and the results are shown in Table 3.

TABLE 3

| Components | Unit | Ex1 | Ex2 | Ex3 | Ex4 | Ex5 | Ex6 | Ex7 | CEx1 |
|---|---|---|---|---|---|---|---|---|---|
| PPA (crystalline) | wt % | 14.5 | 16.5 | 24.75 | 33 | 35 | 37.1 | 39.6 | 49.5 |
| PPA (amorphous) | wt % | 35 | 33 | 24.75 | 16.5 | 14.5 | 12.4 | 9.9 | |
| MRA | wt % | 0.1 | 0.1 | 0.1 | 0.1 | 0.1 | 0.1 | 0.1 | 0.1 |
| PS | wt % | 0.2 | 0.2 | 0.2 | 0.2 | 0.2 | 0.2 | 0.2 | 0.2 |
| AO | wt % | 0.2 | 0.2 | 0.2 | 0.2 | 0.2 | 0.2 | 0.2 | 0.2 |
| Glass fibers | wt % | 50 | 50 | 50 | 50 | 50 | 50 | 50 | 50 |
| Properties | | | | | | | | | |
| SG | | 1.6012 | 1.5883 | 1.5948 | 1.5912 | 1.5871 | 1.5853 | 1.5882 | 1.5986 |
| Flexural modulus | MPa | 15200 | 14800 | 15600 | 15000 | 15800 | 15700 | 15100 | 15100 |
| Flexural strain at break | MPa | 314 | 316 | 343 | 330 | 347 | 339 | 341 | 323 |
| Flexural stress at yield | MPa | 335 | 330 | 353 | 338 | 354 | 360 | 356 | 329 |
| HDT (1.82 MPa, 3.2 mm) | ° C. | 123 | 119 | 115 | 255 | 266 | 269 | 275 | 280 |
| NII | J/m | 125 | 121 | 133 | 160 | 159 | 147 | 150 | 145 |
| UNI | J/m | 802 | 653 | 732 | 972 | 1100 | 891 | 1040 | 1190 |
| Tensile modulus | MPa | 17604 | 17435 | 17237 | 17457 | 17219 | 17328 | 17854 | 16945 |
| Tensile stress | MPa | 256 | 258 | 260 | 260 | 260 | 260 | 258 | 240 |
| Tensile elongation | % | 2.7 | 2.7 | 2.8 | 2.7 | 2.7 | 2.7 | 2.7 | 2.5 |
| Warpage-A | inch | 0 | 0.0022 | 0.015 | 0.0016 | 0.1068 | 0.1114 | 0.1124 | 0.0998 |
| Warpage-B | inch | 0.0028 | 0.002 | 0.012 | 0.006 | 0.002 | 0.022 | 0.0316 | 0.0532 |
| Warpage-C | inch | 0.0022 | 0.0016 | 0.0066 | 0.006 | 0.1072 | 0.1078 | 0.0998 | 0.1038 |

TABLE 3-continued

| Components | Unit | Ex1 | Ex2 | Ex3 | Ex4 | Ex5 | Ex6 | Ex7 | CEx1 |
|---|---|---|---|---|---|---|---|---|---|
| Melt viscosity (320° C.) | | | | | | | | | |
| Shear rate at 100 s$^{-1}$ | Pa·s | 191.2 | 397.87 | 218.83 | 303.93 | 360.29 | 290.66 | 297.3 | 516.12 |
| Shear rate at 200 s$^{-1}$ | Pa·s | 154.7 | 265.81 | 174.08 | 226.58 | 240.39 | 228.79 | 238.73 | 338.21 |
| Shear rate at 500 s$^{-1}$ | Pa·s | 145.34 | 158.71 | 142.13 | 132.19 | 164.46 | 154.95 | 162.25 | 211.54 |
| Shear rate at 1000 s$^{-1}$ | Pa·s | 103.23 | 109.53 | 100.58 | 102.68 | 114.3 | 118.64 | 124.52 | 147.63 |
| Shear rate at 1500 s$^{-1}$ | Pa·s | 78.052 | 96.79 | 88.862 | 88.746 | 98.713 | 102.64 | 106.86 | 128.85 |
| Shear rate at 3000 s$^{-1}$ | Pa·s | 69.571 | 69.461 | 68.794 | 68.499 | 76.015 | 78.719 | 78.829 | 98.562 |
| Shear rate at 5000 s$^{-1}$ | Pa·s | 57.117 | 55.806 | 59.206 | 56.584 | 61.78 | 63.649 | 43.017 | 75.599 |

As shown in Table 3, a higher loading of amorphous PPA provided better (less) warpage. At the same time, melt viscosity also decreased. The modulus and strength were not significantly adversely affected.

This disclosure further encompasses the following aspects.

Aspect 1: A reinforced poly(phthalamide) composition, comprising 20-80 weight percent of a poly(phthalamide) component comprising 15-55 weight percent of a crystalline poly(phthalamide), and 5-45 weight percent of an amorphous poly(phthalamide); 0.5-60 weight percent of a reinforcing filler; and 0.1-50 weight percent of an additive composition; wherein weight percent is based on the total weight of the reinforced poly(phthalamide) composition and totals 100;

wherein:

the crystalline poly(phthalamide) comprises 55 mole percent of units of formula (Ia)

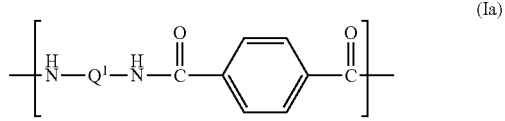

wherein $Q^1$ is 1,6-hexylene; 45 mole percent of units of formula (II)

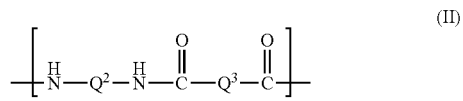

wherein $Q^2$ is 1,6-hexylene and $Q^3$ is 1,4-butylene; and wherein the amorphous poly(phthalamide) comprises 50 mole percent of units of the formula (III)

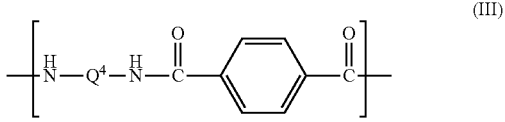

wherein $Q^4$ is 2-methylpentylene; 50 mole percent of units of the formula (IV)

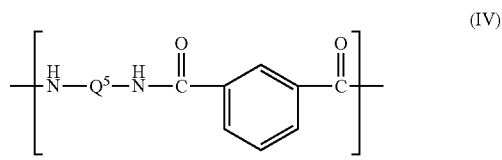

wherein Q is 2-methylpentylene; and wherein the reinforced poly(phthalamide) composition has a capillary melt viscosity, measured according to ASTM D3835 (2015) at 320° C., at 5000 s$^{-1}$, that is at least 10% lower than that of the same reinforced poly(phthalamide) composition without the amorphous poly(phthalamide), and a warpage that is at least 15% lower than that of the same reinforced poly(phthalamide) composition without the amorphous poly(phthalamide).

Aspect 2: The reinforced poly(phthalamide) composition of aspect 1, wherein the crystalline poly(phthalamide) has a crystallinity of greater than 40%; and the amorphous poly (phthalamide) has a crystallinity of less than 40%.

Aspect 3: The reinforced poly(phthalamide) composition of any one or more of aspects 1-2, wherein the reinforcing filler comprises glass fiber, carbon fiber, titanium dioxide, aluminum oxide hydroxide, nitride, metal hydroxide, clay, talc, mica, silica, mineral filler, wollastonite, glass spheres, flaked glass, milled glass, carbon black, preferably glass flake, glass fiber, clay, magnesium (II) hydroxide, talc, alpha-aluminum oxide hydroxide, gamma-aluminum oxide hydroxide, aluminum (III) hydroxide, boron nitride, graphite, or combinations thereof.

Aspect 4: The reinforced poly(phthalamide) composition any one of aspects 1-3, wherein reinforcing filler comprises glass fibers, preferably glass fibers having a length of 2.0-6.0 millimeter, preferably 3.0-4.0 millimeter and an aspect ratio of 2.0-5.0, preferably 3.5-4.5.

Aspect 5: The reinforced poly(phthalamide) composition of any one of aspects 1-4, further comprising an additive composition comprising a particulate filler, anti-blocking agent, impact modifier, ultraviolet light stabilizer, anti-drip agent, antioxidant, anti-static agent, anti-drip agent, blowing agent, dye, flame retardant, flow promoter, fragrance, heat stabilizer, light stabilizer, lubricant, metal deactivator, metal salt, mold release agent, nucleating agent, pigment such as such as titanium dioxide, carbon black, and organic dyes, plasticizer, processing aid, radiation stabilizer, surface effect additive, or a combination thereof.

Aspect 6: The reinforced poly(phthalamide) composition of aspect 5, wherein the additive composition comprises an antioxidant and a mold release agent.

Aspect 7: The reinforced poly(phthalamide) composition of aspect 5, wherein the particulate filler comprises a mineral, metal, polytetrafluoroethylene, glass, carbon, or a combination thereof, preferably a nanoclay.

Aspect 8: The reinforced poly(phthalamide) composition of aspects 1-7, comprising 49.5 weight percent of a poly(phthalamide) component comprising 50 weight percent of a crystalline poly(phthalamide), and 50 weight percent of an amorphous poly(phthalamide); 50 weight percent of a reinforcing filler; and 0.5 weight percent of an additive composition.

Aspect 9: An article comprising the reinforced poly(phthalamide) composition of aspects 1-8.

Aspect 10: The article of aspect 9, comprising a pressure molded, injection molded, or extruded article, preferably a molded article.

Aspect 11: The article of aspects 9-10, wherein the article is an electrical connector, an electrical socket, a circuit board, a circuit board component, a computer component, a display screen component, a communication device component, or a component of a hand-held electronic device.

Aspect 12: The article of aspects 9-11, wherein the article has a thickness of 0.01-2 millimeter, or 0.1-2 millimeter, or 0.5-2 millimeter.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

All ranges disclosed herein are inclusive of the endpoints, and the endpoints are independently combinable with each other. "Combination" is inclusive of blends, mixtures, alloys, reaction products, and the like. The terms "a" and "an" and "the" herein do not denote a limitation of quantity and are to be construed to cover both the singular and the plural, unless otherwise indicated herein or clearly contradicted by context. "Or" means "and/or."

Compounds are described using standard nomenclature. For example, any position not substituted by any indicated group is understood to have its valency filled by a bond as indicated, or a hydrogen atom. A dash ("—") that is not between two letters or symbols is used to indicate a point of attachment for a substituent. For example, —CHO is attached through carbon of the carbonyl group. "Combination thereof" includes at least one of the named elements, optionally together with a like or equivalent element not named.

The term "alkyl" includes branched or straight chain, unsaturated aliphatic $C_{1-30}$ hydrocarbon groups e.g., methyl, ethyl, n-propyl, i-propyl, n-butyl, s-butyl, t-butyl, n-pentyl, s-pentyl, n- and s-hexyl, n- and s-heptyl, and, n- and s-octyl. "Alkylene" means a straight or branched chain, saturated, divalent aliphatic hydrocarbon group (e.g., methylene (—$CH_2$—) or, propylene (—$(CH_2)_3$—)).

Unless substituents are otherwise specifically indicated, each of the foregoing groups can be unsubstituted or substituted, provided that the substitution does not significantly adversely affect synthesis, stability, or use of the compound. "Substituted" means that the compound, group, or atom is substituted with at least one (e.g., 1, 2, 3, or 4) substituents instead of hydrogen, where each substituent is independently nitro (—$NO_2$), cyano (—CN), hydroxy (—OH), halogen, thiol (—SH), thiocyano (—SCN), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_5$ is cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl (—S($=$O)$_2$-alkyl), $C_{6-12}$ arylsulfonyl (—S($=$O)$_2$-aryl), or tosyl ($CH_3C_6H_4SO_2$—), provided that the substituted atom's normal valence is not exceeded, and that the substitution does not significantly adversely affect the manufacture, stability, or desired property of the compound. When a compound is substituted, the indicated number of carbon atoms is the total number of carbon atoms in the compound or group, including those of any substituents.

What is claimed is:
1. A reinforced poly(phthalamide) composition, comprising
20-80 weight percent of a poly(phthalamide) component comprising
14.5-55 weight percent of a crystalline poly(phthalamide), and
5-45 weight percent of an amorphous poly(phthalamide);
0.5-60 weight percent of a reinforcing filler; and
0.1-50 weight percent of an additive composition;
wherein the crystalline poly(phthalamide) comprises
55 mole percent of units of formula (Ia)

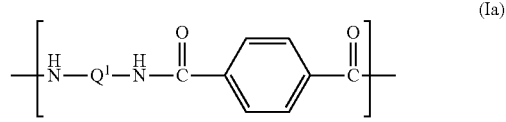

wherein $Q^1$ is 1,6-hexylene;
45 mole percent of units of formula (II)

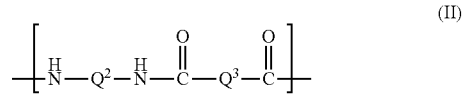

wherein $Q^2$ is 1,6-hexylene and $Q^3$ is 1,4-butylene; and
wherein the amorphous poly(phthalamide) comprises
50 mole percent of units of the formula (III)

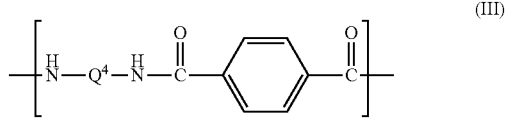

wherein $Q^4$ is 2-methylpentylene; and
50 mole percent of units of the formula (IV)

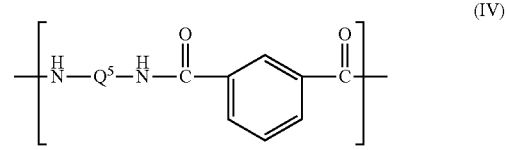

wherein $Q^5$ is 2-methylpentylene,
wherein:
the weight percent of each component, including the crystalline poly(phthalamide) and the amorphous poly(phthalamide), is based on the total weight of the reinforced poly(phthalamide) composition and totals 100; and the reinforced poly(phthalamide) composition has
  a capillary melt viscosity, measured according to ASTM D3835 (2015) at 320° C., at 5000 $s^{-1}$, that is at least 10% lower than that of the same reinforced poly(phthalamide) composition without the amorphous poly(phthalamide), and
  a warpage that is at least 15% lower than that of the same reinforced poly(phthalamide) composition without the amorphous poly(phthalamide).

2. The reinforced poly(phthalamide) composition of claim 1, wherein
  the crystalline poly(phthalamide) has a crystallinity of greater than 40%; and
  the amorphous poly(phthalamide) has a crystallinity of less than 40%.

3. The reinforced poly(phthalamide) composition of claim 1, wherein the reinforcing filler comprises glass fiber, carbon fiber, titanium dioxide, aluminum oxide hydroxide, nitride, metal hydroxide, clay, talc, mica, silica, mineral filler, wollastonite, glass spheres, flaked glass, milled glass, carbon black, glass flake, glass fiber, clay, magnesium (II) hydroxide, alpha-aluminum oxide hydroxide, gamma-aluminum oxide hydroxide, aluminum (III) hydroxide, boron nitride, graphite, or combinations thereof.

4. The reinforced poly(phthalamide) composition of claim 1, wherein reinforcing filler comprises glass fibers having a length of 2.0-6.0 millimeters.

5. The reinforced poly(phthalamide) composition of claim 1, wherein the additive composition comprises an anti-blocking agent, an impact modifier, an ultraviolet (UV) light stabilizer, an anti-drip agent, an antioxidant, an anti-static agent, a blowing agent, a dye, a flame retardant, a flow promoter, a fragrance, a heat stabilizer, a light stabilizer, a lubricant, a metal deactivator, a metal salt, a mold release agent, a nucleating agent, a pigment, a plasticizer, a processing aid, a radiation stabilizer, a surface effect additive, or a combination thereof.

6. The reinforced poly(phthalamide) composition of claim 5, wherein the additive composition comprises an antioxidant and a mold release agent.

7. The reinforced poly(phthalamide) composition of claim 1, comprising
  49.5 weight percent of the poly(phthalamide) component comprising
    24.75 weight percent of the crystalline poly(phthalamide), and
    24.75 weight percent of the amorphous poly(phthalamide);
  50 weight percent of the reinforcing filler; and
  0.5 weight percent of the additive composition.

8. An article comprising the reinforced poly(phthalamide) composition of claim 1.

9. The article of claim 8, comprising a pressure molded, injection molded, or extruded article.

10. The article of claim 8, wherein the article is an electrical connector, an electrical socket, a circuit board, a circuit board component, a computer component, a display screen component, a communication device component, or a component of a hand-held electronic device.

11. The article of claim 8, wherein the article has a thickness of 0.01-2 millimeter.

* * * * *